Dec. 29, 1942.   J. F. MILLER   2,306,461
JIG FOR SERVICING AND TESTING VACUUM PUMPS
Filed March 17, 1941    3 Sheets-Sheet 1

Inventor
JOSEPH F. MILLER
By Hazard and Miller
Attorneys

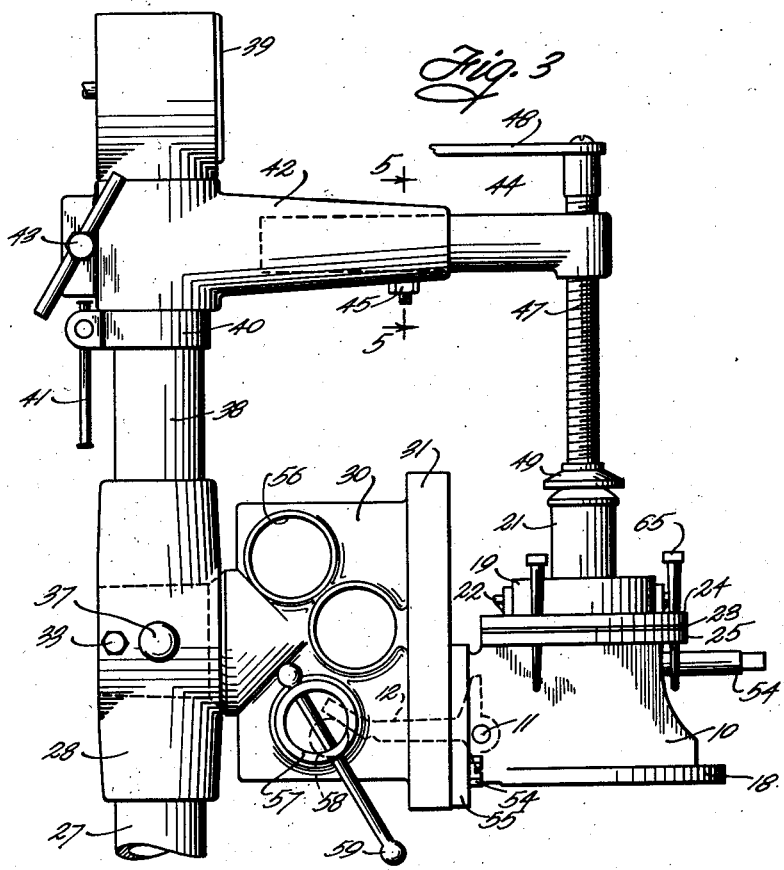

Dec. 29, 1942.  J. F. MILLER  2,306,461
JIG FOR SERVICING AND TESTING VACUUM PUMPS
Filed March 17, 1941  3 Sheets-Sheet 3
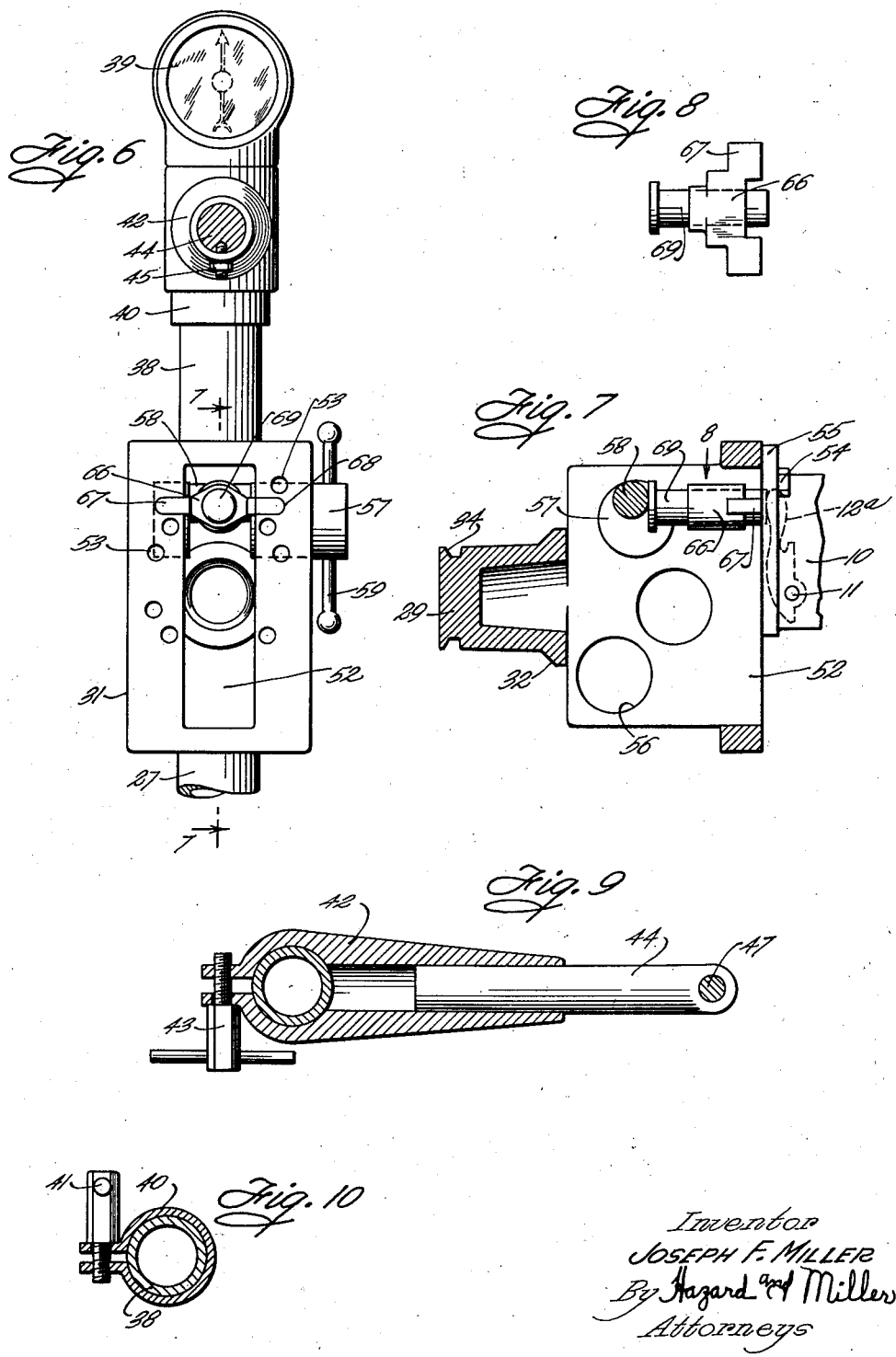
Inventor
JOSEPH F. MILLER
By Hazard and Miller
Attorneys Patented Dec. 29, 1942

2,306,461

UNITED STATES PATENT OFFICE 2,306,461

JIG FOR SERVICING AND TESTING VACUUM PUMPS

Joseph F. Miller, San Gabriel, Calif.

Application March 17, 1941, Serial No. 383,871

10 Claims. (Cl. 29—84)

This invention relates to a jig for servicing and testing vacuum pumps and fuel pumps, such as are now being conventionally employed on automobiles for creating a vacuum to operate windshield wipers and/or other accessories and to pump gasoline from the fuel tank of the automobile to the carburetor.

These vacuum pumps or combined fuel and vacuum pumps generally consist of a housing made up of two or more parts joined together by companion flanges between which there is a diaphragm. The diaphragm is actuated by means of a rocker arm or equivalent operating mechanism that is usually operated off of the cam shaft of the automobile engine. The edges of the diaphragm are positioned between the companion flanges of the housing and on assembling the construction the edges are effectively clamped thereby. The usual vacuum pump however has one of the parts of the housing formed by a cap within which there is a relatively heavy coil spring which constantly presses against one face of the diaphragm when the pump is assembled. This spring is relatively heavy as it must be capable of exerting sufficient force on its side of the diaphragm to oppose atmospheric pressure applied to the opposite face of the diaphragm. When these diaphragms become worn or leak and require replacement, it is quite difficult to apply the cap with its contained coil spring to the body of the diaphragm without distorting the diaphragm prior to the tightening of the companion flanges. Consequently, when the diaphragm is replaced and the cap applied, the spring distorts the diaphragm and moves it out of its neutral position so that the edges of the diaphragm are usually wrinkled prior to the tightening of the companion flanges. The wrinkling of the diaphragm shortens its wearing life and tends to promote leakage when the pump is re-assembled.

An object of the present invention is to provide a jig for servicing vacuum pumps of this character which will facilitate the application of the diaphragm and provide means for holding or supporting the diaphragm in its flat or neutral position so that when the cap is applied its spring may be compressed without distorting the diaphragm or moving it from the neutral position whereby, when the companion flanges are tightened the edges of the diaphragm will be clamped therebetween without wrinkling.

Another object of the invention is to provide a jig for servicing vacuum pumps wherein provision is made for operating the pump after it has been re-assembled and testing the pump to determine whether or not it is functioning properly.

Another object of the invention is to provide a jig for servicing and testing vacuum pumps which is of neat, simple, and durable construction and which is so designed as to be capable of being effectively used on a large variety of different styles of vacuum pumps.

With the foregoing and other objects in view, which will be made manifest in the following detailed description and specifically pointed out in the appended claims, reference is had to the accompanying drawings for an illustrative embodiment of the invention, wherein:

Fig. 3 is a view in side elevation of the jig illustrating the pump in inverted position thereon;

Fig. 4 is a detailed view in vertical section taken substantially upon the line 4—4 upon Fig. 1;

Fig. 5 is a view in vertical section taken substantially upon the line 5—5 upon Fig. 3;

Fig. 6 is a view in end elevation of the jig, parts being broken away and shown in vertical section, and illustrating an accessory applicable thereto for converting the jig for use on alternative forms of vacuum pumps;

Fig. 7 is a sectional view taken on line 7—7 upon Fig. 6;

Fig. 8 is a top plan view of the accessory as applied to the jig as shown in Figs. 6 and 7;

Fig. 9 is a horizontal section taken substantially upon the line 9—9 upon Fig. 1; and Fig. 10 is a horizontal section taken substantially upon the line 10—10 upon Fig. 1.

Figure 1:
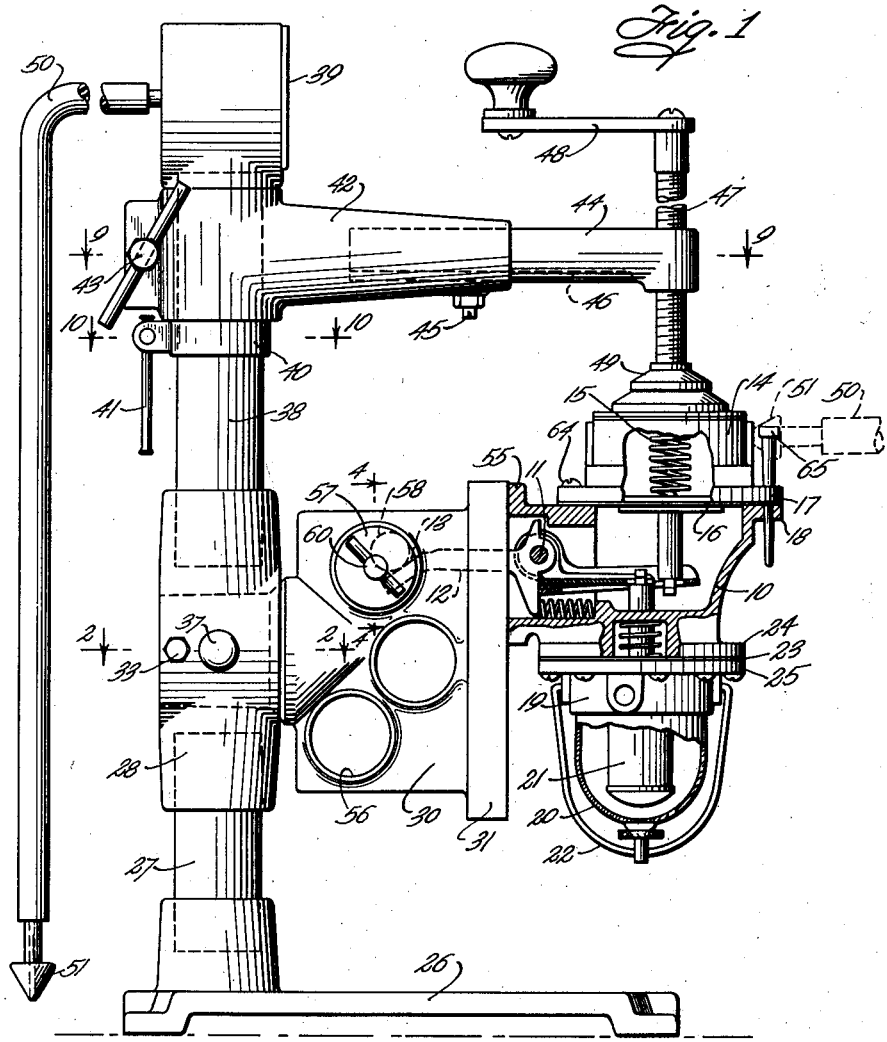
Figure 1 is a view in side elevation of the jig embodying the present invention illustrating a combined vacuum and fuel pump in applied position thereon, the combined vacuum and fuel pump being shown in vertical section.
Figure 2:
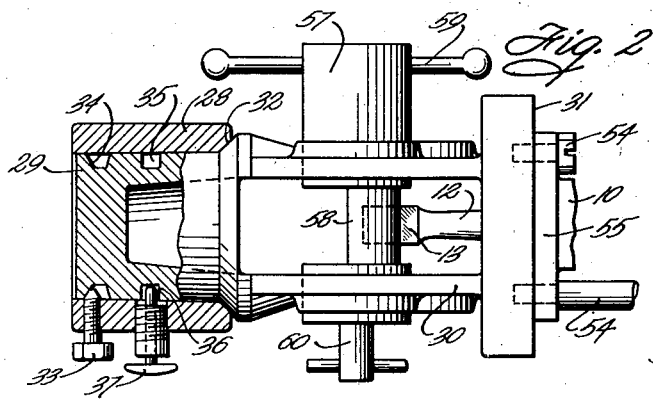
Fig. 2 is a horizontal section taken substantially upon the line 2—2 upon Fig. 1.

Referring to the accompanying drawings wherein similar reference characters designate similar parts throughout, I have illustrated in Fig. 1 one form of combined vacuum and fuel pump such as is now conventionally used upon automobiles. This pump comprises a central body portion 10 within which has pivotally mounted, as at 11, a rocker arm 12, the end 13 of which is engageable with the cam shaft of the automobile engine so that it may be rocked or oscillated thereby. On top of the body portion 10 there is provided a cap 14 within which there is a heavy coil compression spring 15. The diaphragm that requires replacement from time to time is indicated at 16, and has its edges positioned between the companion flanges 17 and 18 on the cap and body respectively. At the bottom of the body there is illustrated a holder 19 for a glass sediment cup 20 within which is disposed a screen 21. This cup is held in applied position by means of a bail 22 and the diaphragm 23 of the fuel pump has its edges positioned between companion flanges 24 and 25. The two diaphragms 16 and 23 are simultaneously actuated by the rocker arm 12. The lower diaphragm 23 in the case of a combined vacuum and fuel pump serves to pump fuel from the fuel tank of the automobile to the carburetor, the fuel being caused to pass into jar or cup 20 and through the screen 21.

The jig embodying the present invention comprises a base 26 which supports an upstanding column 27 on top of which is mounted a tubular coupling 28. This coupling is transversely bored to receive the arbor 29 of a holder 30 having a face plate 31. The holder has a tapered shoulder 32 which fits against a tapered seat formed on coupling 28. A take-up is provided by means of a screw 33 which bears against the inclined side of a groove 34 in the arbor. Diametrically opposed recesses are formed in the arbor indicated at 35 and 36, and a spring actuated plunger 37 is adapted to enter either of these recesses to lock the arbor against rotation. On withdrawing the plunger, the holder 30 may be rotated and inverted from the position shown in Fig. 1 into the position shown in Fig. 3. It may be locked in this inverted position by releasing the plunger 37 and allowing it to enter recess 35.

On top of the coupling 28 there is another column section 38 on the top of which there is mounted a vacuum gauge 39. A clamping collar 40 is adjustable along the length of the upper column section 38 and may be clamped in any adjusted position by turning its handle 41 to effect a clamping, as is indicated in Fig. 10. Supported on this adjustable clamping collar is a telescopic arm composed of an inner section 42 equipped with a clamping nut 43 and an outer section 44 slidably keyed in the inner section as by a screw 45 extending into a keyway 46 on its under side. In the outer end of the outer section 44 there is threaded a jack screw 47 having a crank 48 and a cap 49 engageable with the top of cap 14 of the vacuum pump. A hose 50 is connected to the vacuum gauge 39 and has a head 51 preferably formed of rubber which may be applied to the opening in the cap 14 of the vacuum pump.

The face of the face plate 31 on holder 30 has a large central opening formed therein indicated at 52 designed to accommodate or receive the projecting end of the rocker arm 12. Also, in this face there are a plurality of drilled and tapped holes 53 so arranged as to accommodate bolts or screws 54 that are driven through holes in the flange 55 of the vacuum pump. Different makes of vacuum pumps have the holes in flange 55 differently arranged and the holes 53 in the face plate 31 are so arranged as to accommodate substantially any arrangement of holes that may be in flange 55.

Extending transversely through the holder 30 there are a plurality of cylindrical openings 56 which are designed to optionally receive a short shaft 57 having a crank pin 58 that is positioned in the opening 52. This short shaft may be rotated by means of a handle 59 and locked in adjusted position by means of a screw 60 having a tapered end 61 engageable with radially expandable plungers 62 which are normally restricted by means of spring 63.

The arrangement of the transverse openings 56 is such as to properly position the short shaft 57 so that it will be engageable with the end 13 of the rocker arm 12 of virtually any conventional means of vacuum pump. Thus, these openings are arranged at different distances from the face of the face plate 31 and by shifting the shaft from one opening to another it may be positioned so as to be engageable with the end 13 of rocker arm 12 regardless of the length of the rocker arm.

The operation and advantages of the above-described construction are as follows: When it is desired to replace the diaphragm 16 of the vacuum pump, the vacuum pump is first applied to the face plate 31 and attached thereto by means of bolts 54. The screws or bolts 64 may then be taken out to permit removal of the cap 14. The shaft 57 is then loosened and rotated until its crank pin 58 engages end 13 of the rocker arm 12 and the rocker arm is moved thereby until it lifts the old or worn diaphragm 16 into a neutral or flat position. When thus adjusted, shaft 57 is locked in place by means of the screw 60. The cap 14 and the spring 15 having been removed from the pump, a new diaphragm is then applied which will be supported by the rocker arm 12 in neutral or flat position in spite of any pressures that may be applied thereto on compressing spring 15 against its upper side. The cap 14 is then positioned over the diaphragm and aligning pins 65 may be dropped through the holes in the companion flanges 17 and 18 to align or register the holes for the bolts 64 therein. The telescopic arm is then elevated on the upper column section 38 and the collar 40 is clamped to support this arm at the proper elevation. The telescopic arm may then be swung or turned about the upper column section 38 and adjusted as to length so as to position head 49 over the center of cap 14. The jack screw 47 is then rotated by turning the crank 48 which forces cap 14 downwardly into engagement with the top surface of the new diaphragm 16. In so doing, the spring 15 is compressed but the pressure exerted thereby on the diaphragm 16 does not distort the diaphragm or move it from its neutral or flat position because of the fact that the diaphragm is supported on its under side by the locked rocker arm 12. When the companion flanges 17 and 18 are brought into clamping relation with the edges of the new diaphragm 16, the bolts or screws 64 may be replaced. Thus, the edges of the diaphragm will not be wrinkled or distorted but will be perfectly flat where they are clamped between the companion flanges. The jack screw 47 can then be backed off of the cap and the telescopic arm swung out of the way.

It is desirable then to test the pump for leakage. To accomplish this screw 60 is loosened to permit shaft 57 to be rotated or oscillated. The head 51 on the hose 50 is then applied to the inlet opening in the cap of the pump and firmly held thereagainst to prevent leakage. Shaft 57 is then oscillated to effect a rocking of the rocker arm 12. This rocking of the rocker arm 12 is similar to the motion imparted thereto by the cam shaft of the automobile engine and causes the diaphragm 16 to be worked in its normal manner. As it works, a vacuum is created within the cap 14 and within the hose 50 which is transmitted to the vacuum gauge 39. If the replaced diaphragm is working properly the vacuum created is readily visible on the dial of the vacuum gauge. If it should leak this is detected by the needle of the vacuum gauge slowly dropping. If the replaced diaphragm does not leak this is ascertained by the needle of the vacuum gauge remaining stationary. In the latter event, the mechanic may be assured that the vacuum pump is working properly and when re-installed on the automobile engine it will function properly.

When it is desired to replace diaphragm 23 of the fuel pump this can be readily accomplished by withdrawing plunger 37 permitting the holder 30 to be turned about a horizontal axis through a half revolution. The fitting 19 can then be removed and the rocker arm 12 again locked in place by means of the shaft 57 and its crank pin 58 to support this diaphragm in its flat or neutral position. A new diaphragm may then be applied and the fitting 19 re-installed in the manner illustrated in Fig. 3.

In replacing diaphragm 23, the diaphragm will likewise be held in its neutral position so that when the companion flanges 24 and 25 are bolted together there will be no wrinkling or distortion of the diaphragm which might cause leakage or reduce the wearing life of the replaced diaphragm.

When the diaphragms 16 and 23 have been thus replaced and tested as indicated by the dotted lines on Fig. 1, and determined to be functioning properly the vacuum pump or combined vacuum and fuel pump can then be removed from the face plate 31 and applied or re-installed on the automobile engine.

In some forms of vacuum pump the rocker arm instead of having a projecting end as shown on Fig. 1, has an internal rocker arm as illustrated at 12a upon Fig. 7. In order to make the improved jig suitable for use on pumps possessing these rocker arms, I provide a small fitting 66 having lateral wings 67 which are receivable in slots 68 formed on the face plate. A transmitter 69 is slidable therethrough and is engageable with the end of rocker arm 12a and with the crank pin 58 as shown on Fig. 7. In using this accessory to the jig the shaft 57 is adjusted so as to position the crank pin 58 to bear upon the transmitter 69 and hold the rocker arm 12a in such position that the diaphragm of the vacuum pump will be supported thereby in flat or neutral position. In this manner, on closing the pump as above described, the diaphragm will not be distorted or wrinkled by the pressure applied thereto on compressing spring 15. When the diaphagm has been replaced it may be tested as above described by oscillating shaft 57 which causes crank pin 58 to reciprocate transmitter 69 and thus rock the rocker arm 12a to operate the diaphragm and thus effect the test.

From the above-described construction it will be appreciated that the improved jig is so designed as to accommodate a large number of different designs of vacuum pumps; that it makes provision for supporting the diaphragm in neutral position or flat condition while the parts of the housing are being re-assembled. After the pump has been re-installed it also enables a test to be made to ascertain that the replaced diaphragm is functioning properly.

Various changes may be made in the details of construction without departing from the spirit or scope of the invention as defined by the appended claims.

I claim:

1. A jig for servicing vacuum pumps of the type having a body, a cap, a diaphragm located between the body and cap, a spring between the cap and diaphragm, and an operating means for vibrating the diaphragm comprising a supporting column, means for mounting a vacuum pump thereon, means for holding the diaphragm operating means of the pump in a position wherein the diaphragm of the pump will be in a flat or neutral position, and means mounted on a column for forcing the spring and cap of the pump into a position wherein the cap closes the body and the spring is compressed whereby the parts may be brought together for securement without distorting the diaphragm or dislodging it from its neutral position.

2. A jig for servicing vacuum pumps of the type having a body, a cap, a diaphragm located between the body and cap, a spring between the cap and diaphragm, and an operating means for vibrating the diaphragm comprising a supporting column, means for mounting a vacuum pump thereon, means for holding the operating means of the pump in a position wherein the diaphragm of the pump will be in a flat or neutral position, and forcing means axially adjustable upon the column for forcing the cap of the pump into closed position thus compressing the spring whereby the parts may be brought together for securement without displacing the diaphragm under the action of the compressed spring.

3. A jig for servicing vacuum pumps of the type having a body, a cap, a diaphragm located between the body and cap, a spring between the cap and diaphragm, and an operating means for vibrating the diaphragm comprising a supporting column, means for mounting a vacuum pump thereon, means for holding the operating means of the pump in a position wherein the diaphragm of the pump will be in a flat or neutral position, an extensible arm axially and rotatably adjustable upon the column, and forcing means carried by said arm for forcing the cap of the pump into closed position thereby compressing the spring whereby the parts may be brought together for securement without distorting or displacing the diaphragm from its neutral position.

4. A jig for servicing vacuum pumps of the type having a body, a cap, a diaphragm located between the body and cap, a spring between the cap and diaphragm and an operating means for vibrating the diaphragm comprising a supporting column, means for mounting a vacuum pump thereon, rotatably adjustable means on the mounting means engageable with the operating means of the pump so that the diaphragm of the pump may be held thereby in flat or neutral position, means for holding said rotatably adjustable means in adjusted position, and forcing means mounted on the column for forcing the cap of the pump into closed position upon the body thereby compressing the spring whereby the parts may be brought together for securement without distorting the diaphragm or displacing it from its neutral position.

5. A jig for servicing vacuum pumps of the type having a body, a cap, a diaphragm located between the body and cap, a spring between the cap and diaphragm, and an operating means for vibrating the diaphragm comprising a supporting column, means for mounting the vacuum pump thereon, rotatably adjustable means on said means engageable with the operating means of the pump so that the diaphragm of the pump may be held thereby in flat or neutral position, means for holding the rotatably adjustable means in adjusted position, and forcing means mounted on the column for forcing the cap of the pump into closed position thereby compressing the spring whereby the parts may be brought together for securement without displacing the diaphragm from its neutral position, said mounting means being rotatable about an axis at right angles with respect to the length of the supporting column.

6. A jig for servicing vacuum pumps of the type having a body, a cap, a diaphragm located between the body and cap, a spring between the cap and diaphragm, and a supporting means for vibrating the diaphragm comprising a supporting column, a holder mounted upon the supporting column for rotational adjustment about an axis at right angles to the supporting column, said holder being adapted to support a vacuum pump thereon, means on the holder adapted to engage the operating means at the pump and hold it in a position wherein the diaphragm of the pump will be supported in flat or neutral position, and forcing means on the column for forcing the cap of the pump into closed or diaphragm-clamping position thereby compressing the spring whereby the parts may be brought together for securement without displacing the diaphragm from its neutral position.

7. A jig for vacuum pumps of the type having a body, a cap, a diaphragm located between the body and cap, a spring between the cap and diaphragm, and an operating means for vibrating the diaphragm comprising a supporting column, means for mounting a vacuum pump thereon, a shaft rotatably mounted upon said means having a crank pin engageable with the operating means for the pump to hold the operating means in such position wherein the diaphragm of the pump will be supported in flat or neutral position, and an arm on the column over said holding means having a jackscrew mounted thereon arranged to force the cap of the pump into closed position thus compressing the spring whereby the parts may be brought together for securement without displacing the diaphragm from its neutral position.

8. A jig for vacuum pumps of the type having a body, a cap, a diaphragm located between the body and cap, a spring between the cap and diaphragm, and an operating means for vibrating the diaphragm comprising a supporting column, means for mounting a vacuum pump thereon, a shaft rotatably mounted upon said means having a crank pin engageable with the operating means of the pump, an arm rotatably and extensibly adjustable upon said column, and a jackscrew mounted on the outer end of the arm engageable with the cap of the pump for forcing the cap into closing position upon the body thereby compressing the spring whereby the parts may be brought together for securement without distorting the diaphragm.

9. A jig for vacuum pumps of the type having a body, a cap, a diaphragm located between the body and cap, a spring between the cap and diaphragm, and an operating means for vibrating the diaphragm comprising a supporting column, a holder for a vacuum pump mounted on the supporting column, said holder having a recess therein adapted to receive a portion of the operating means of the pump, means on the holder engageable with said portion of the operating means to hold the operating means in a desired position wherein the diaphragm will be in neutral position, and screw means mounted on the supporting column engageable with the cap of the pump for forcing the cap into closed position thereby compressing the spring whereby the parts may be brought together for securement without displacing the diaphragm from its neutral position.

10. A jig for vacuum pumps of the type having a body, a cap, a diaphragm located between the body and cap, a spring between the cap and diaphragm, and an operating means for vibrating the diaphragm comprising a supporting column, a holder having a face against which a vacuum pump may be secured, said holder having a recess in said face adapted to accommodate a portion of the operating means of the pump, rotatably adjustable means extending transversely across said recess so as to be engageable with said portion of the operating means, and screw means mounted on the column so as to be disposed forwardly of said face adapted to force the cap of the pump into closed position thereby compressing the spring whereby the parts may be brought together for securement without displacing the diaphragm from the position in which it is held by said rotatably adjustable means.

JOSEPH F. MILLER.